Patented Dec. 27, 1927.

1,653,851

UNITED STATES PATENT OFFICE.

ERICH HARTMANN, OF WIESDORF, NEAR COLOGNE, GERMANY, ASSIGNOR, BY MESNE ASSIGNMENTS, TO GRASSELLI DYESTUFF CORPORATION, OF NEW YORK, N. Y., A CORPORATION OF DELAWARE.

LAKE.

No Drawing. Application filed December 27, 1923, Serial No. 683,059, and in Germany May 22, 1923.

I have found that the fastness to light of lakes produced with basic or acid dyestuffs, which contain in addition to a sulfo group or groups amino groups, can be considerably increased by using complex compounds containing both tungsten and molybdenum, for example, molybdenum phosphotungstates and molybdenum silicotungstates.

These products, which so far as I am aware, are new, can be obtained by dissolving 90 parts of sodium tungstate, 10 parts of sodium molybdate and 10 parts of sodium phosphate together in water, heating to boiling for 15 minutes and precipitating the sodium molybdenum phosphotungstates with concentrated hydrochloric acid and a small quantity of concentrated nitric acid. The yellow salt gives a colourless solution in water.

Or 90 parts of sodium tungstate and 10 parts of sodium molybdate are dissolved in water, freshly precipitated silicic acid is added and the mixture is then heated to boiling for one hour. It is filtered and from the filtrate the sodium molybdenum silicotungstate is precipitated with hydrochloric acid containing a small amount of nitric acid. A pure yellow product results, soluble in water to a colourless solution.

The substances comprising this group are, generally speaking, derivatives of the complex phosphotungstic acid, or its sodium salt, described in Gmelin-Kraut, "Handbuch der anorganischen Chemie", 1912, Vol. III, part 1, page 823, the formula for which is given as $$2Na_2O.P_2O_5.24WO_3 + 27H_2O.$$

The novel "molybdenum phosphotungstates" described in the present application theoretically are derived from the above complex phosphotungstate salt by replacing part of the tungstic component by a molybdenum component, and the novel "molybdenum silicotungstates" herein described are derived therefrom by replacing the phosphoric component by a silicic component.

In order to illustrate my invention the following examples are given:—

*Example 1.*—100 parts by weight of a 10 per cent hydrate of alumina paste are mixed with a solution of 1 part by weight of brilliant green extra dissolved in 100 parts by weight of boiling water. A solution of molybdenum phosphotungstate is added until the dye is precipitated.

The complex sodium molybdenum phosphotungstate obtained according to the above example corresponds substantially to the formula $$2Na_2O.P_2O_5.24(WO_3 + MoO_3) + aqua,$$

the proportion of $WO_3$ to $MoO_3$ being about 9 to 1. In general, the sum total of $WO_3$ and $MoO_3$ components must be 24.

Other basic dyes can be used, e. g. methyl violet R and B, China green, auramine O.

*Example 2.*—50 parts by weight of heavy spar are stirred up with water into a paste like mass, 10 parts by weight of aluminium sulfate (18 per cent $Al_2O_3$) dissolved in 100 parts by weight of water and then 5 parts by weight of calcined sodium carbonate dissolved in 50 parts by weight of water are added with stirring. Subsequently the hot aqueous solution of 5 parts by weight of brilliant wool blue FFR extra and the aqueous solution of 2.5 parts by weight of sodium molybdenum phosphotungstate are added and the lake is then precipitated with a solution of 17 parts by weight of crystallized barium chloride dissolved in 170 parts by weight of water. It is immaterial whether the sodium molybdenum phosphotungstate be added before, after or simultaneously with the dye.

Instead of brilliant wool blue FFR extra other acid dyes, such as for example acid green GG extra, acid violet 4 B extra and R extra can be used, the relative proportions remaining substantially the same.

I claim:—

1. A lake comprising a dyestuff having both sulfo- and amino groups associated with a complex compound containing tungsten, molybdenum, the anhydride of one of the acids of the group phosphoric acid and silicic acid, and a substratum, and possessing great fastness towards light, substantially as described.

2. A lake comprising a basic dyestuff associated with a complex compound containing tungsten, molybdenum, and an anhydride of one of the acids of the group phosphoric acid and silicic acid, and a substratum and possessing great fastness towards light, substantially as described.

3. A lake of great fastness towards light comprising a dyestuff having both sulfo- and amino groups in combination with a molybdenum phosphotungstate compound and a substratum, substantially as described.

4. A lake of great fastness towards light comprising a basic dyestuff in combination with a molybdenum phosphotungstate compound and a substratum, substantially as described.

5. A lake comprising a dyestuff having both sulfo- and amino groups in combination with a molybdenum phosphotungstate compound and a substratum of insoluble barium compound, substantially as described.

6. A lake comprising a basic dyestuff in combination with a molybdenum phosphotungstate compound and a substratum of insoluble barium compound, substantially as described.

In testimony whereof I have hereunto set my hand.

ERICH HARTMANN.